United States Patent [19]
Svetkoff et al.

[11] Patent Number: 5,822,486
[45] Date of Patent: Oct. 13, 1998

[54] SCANNED REMOTE IMAGING METHOD AND SYSTEM AND METHOD OF DETERMINING OPTIMUM DESIGN CHARACTERISTICS OF A FILTER FOR USE THEREIN

[75] Inventors: Donald J. Svetkoff, Ann Arbor; Donald B. T. Kilgus, Brighton, both of Mich.

[73] Assignee: General Scanning, Inc., Simi Valley, Calif.

[21] Appl. No.: 552,347

[22] Filed: Nov. 2, 1995

[51] Int. Cl.$^6$ ........................................................ G02B 6/06
[52] U.S. Cl. ............................................................ 385/116
[58] Field of Search ......................................... 385/115, 116, 385/117, 121, 129; 358/433, 426, 432, 453; 455/67.7, 228; 362/8, 282; 600/109, 180; 348/69, 230

[56] References Cited

U.S. PATENT DOCUMENTS

| | | | |
|---|---|---|---|
| 4,399,556 | 8/1983 | Whidden | 455/67.2 |
| 4,565,484 | 1/1986 | Brown et al. | 343/761 |
| 4,645,917 | 2/1987 | Penney et al. | 250/201 |
| 4,729,018 | 3/1988 | Watanabe | 348/69 |
| 4,764,655 | 8/1988 | Ortiz, Jr. et al. | 219/121.83 |
| 4,838,631 | 6/1989 | Chande et al. | 219/121.8 |
| 4,900,146 | 2/1990 | Penney et al. | 356/1 |
| 4,928,172 | 5/1990 | Uehara et al. | 348/69 |
| 5,032,023 | 7/1991 | Schneiter | 356/1 |
| 5,128,776 | 7/1992 | Scorse et al. | 358/426 |
| 5,134,469 | 7/1992 | Uchimura | 600/109 |
| 5,200,838 | 4/1993 | Nudelman et al. | 358/443 |
| 5,245,682 | 9/1993 | Ortiz, Jr. | 385/33 |
| 5,426,513 | 6/1995 | Scorse et al. | 358/433 |

OTHER PUBLICATIONS

"Endoscope with Optical Sectioning Capability", L. Guniunas, R. Juskaitis and S.V. Shatalin, Applied Optics, vol. 332, No. 16, Jun. 1, 1993, pp. 2888–2890.

"High–Speed Remote Laser Scanning Using Coherent Fiber Optics", Donald Svetkoff, Donald B.T. Kilgus, David P. Berrich, SPIE, vol. 2348, pp. 57–66 (May 1995).

Analog Devices, Inc., "Mastering the Mix in Signal Processing" Mixed–Signal Design Seminar, pp. 115–119 (1991).

"Confocal Microscopy through a Fiber—Optic Imaging Bundle", A.F. Gmitro and David Aziz Optics Letters (Apr. 15, 1993) vol. 18, No. 8, pp. 565–567.

"Fiber–Optic Confocal Microscope: FOCON", Tim Dabbs and Monty Glass, Applied Optics vol. 31, No. 16, (Jun. 1, 1992) pp. 3030–3035.

"A Scanned Optical Fiber Confocal Microscope", D. Dickensheets and G. S. Kino, SPIE, vol. 2184 Three–Dimensional Microscopy (1994) pp. 39–47. (No month).

*Primary Examiner*—Akm E. Ullah
*Attorney, Agent, or Firm*—Brooks & Kushman P.C.

[57] ABSTRACT

An imaging method and system for optimum sampling, image restoration and enhancement is disclosed where imaging errors associated with scanning a fiber optic image guide are identified and filtered to restore image quality to the available resolution limit. Scanned image samples are synchronized with spot positions corresponding to the center of each fiber to avoid generating spurious data resulting from unwanted modulation of the scanning beam by the fiber optic array, manifested as large amplitude multiplicative noise. A detector, such as a position sensitive device, is utilized which allows for monitoring both spot intensity and position. Peak detection on the intensity waveform determines the instant at which the beam is to be sampled. The method applies to any imaging system where a beam of electromagnetic energy such as radiant energy is scanned through a plurality of optical fibers to irradiate the object under examination. Various embodiments are disclosed which, depending upon application requirements, affect the level and sophistication of the signal processing hardware. The imaging system may utilize grey scale, color, motion (as in a Doppler vibrometry system) or 3D information.

20 Claims, 10 Drawing Sheets

SCANNED REMOTE IMAGING METHOD AND SYSTEM AND METHOD OF DETERMINING OPTIMUM DESIGN CHARACTERISTICS OF A FILTER FOR USE THEREIN

TECHNICAL FIELD

This invention relates to imaging methods and systems and, in particular, to scanned remote imaging methods and systems and method of determining optimum design characteristics of a filter for use therein.

BACKGROUND ART

Remote imaging techniques are used throughout the medical, automotive, and aerospace industries providing critical inspection capability which justifies the cost of fiber optic image guides and other specialized hardware. The imaging requirement may be driven by space restrictions, weight, multi-axis motion requirements, or environmental factors. Borescopes utilizing coherent fiber optic image guides are a popular choice, providing inspection capability that would otherwise be impossible.

Conventional Imaging With Fiber Optics

In typical fiber optic based imaging systems, the sample under test is illuminated with incoherent light transmitted by means of a fiber optic light guide, a coherent image guide is used for image pickup, and the image is transmitted to a sensor or human eye. Various arrangements of light guides and lenses for the illumination and receiving sections are available. With systems, including image intensifiers, the fiber optic arrays are abutted to the imager. Likewise, self focusing arrays may be used and can provide space advantages in certain applications provided that certain operational constraints are satisfied.

High resolution imagery is achievable with image guides: typical element sizes of 10 $\mu$m are used with arrays which may be thousands of elements in each dimension to produce a good space-bandwidth product. A method for improving the effective resolution with translation of the fiber ends is known by prior art but is not widely utilized due to extra expense and additional hardware.

Fiber optic image guides are typically constructed as a series of small arrays consisting of 5–60 $\mu$m diameter multi-mode fibers separated by a thin cladding a few microns in thickness. As with light guides, the array may be branched so that multiple regions may be imaged. With standard image guides, the typical fiber element size is approximately matched to that of many CCD array cameras. Either high numerical aperture (N.A.) glass fibers or lower N.A. quartz fibers can be used in the arrays. Alternatively, self-focusing arrays can be used, and such imaging arrays are fabricated as an arrangement of fibers having variable index cores, often modeled as waveguides having parabolic index variations. For each application, the benefits of using fiber optics must exceed the requirements of increased light source power, lower f/# optics, restricted depth of focus, and cost. Important considerations for the use of fiber optic arrays are well documented for both illumination and imaging systems.

Image Formation With Scanning Beam and Coherent Fiber Optic Delivery System

An alternative method for image formation is to focus a scanning laser beam onto a grid or array arrangement of coherent optic fibers. At the fiber output end a relay system is used to irradiate the object under test, which may be located remotely, with the scanning beam. Depending upon the application, the relay system may be miniaturized or avoided with a self-focusing lens or fiber array. An image is formed with a detection system which receives energy which is backscattered into the fiber array, or is otherwise positioned or possibly coupled by means of a light guide so as to collect energy reflected from the object. Illustrations of such arrangements can be found in U.S. Pat. Nos. 4,645,917 and 5,200,838.

Alternative remote scanning arrangements using a single fiber and a deflector coupled to the fiber are also known, but these latter techniques incorporate micro-mechanical moving part in the remote imaging head. The associated compact, remote laser scanning head can prove useful for many applications, particularly if depth or wide dynamic range multi-spectral information is required for each point in the scene. A few possible benefits are as follows:

3D or laser based color imaging in space restricted areas;

Scanning multiple regions with a single deflection mechanism;

Rugged design for multi-axis robotic applications; and

Additional functionality without a size or weight penalty for mobile imaging head requirements.

Image quality in fiber scanned systems is subject to several sources of degradation. Although illumination systems are not generally sensitive to scattering losses and manufacturing defects, such problems are of great concern for imaging. Stray light levels may be increased and accuracy and image contrast severely compromised. Thin cladding, microscopic cracks, and extreme bends are known to produce optical crosstalk. For imaging applications where the fiber output face is physically separated (i.e., fiber and laser not abutted) from the source, pointing accuracy can be reduced by wedge (angular offset in the plane defining the air/glass interface).

Extra manufacturing precision is required for overall fiber-to-fiber uniformity and simplified alignment requirements. Breakage specifications of about 0.5% are typical and these defects, which may increase in harsh environments, must be monitored if coherent arrays are to be used for imaging, regardless of whether the image or object is scanned. Such deficiencies, many of which are often considered as "second order", are difficult to model and predict but are of critical importance if coherent arrays are to be used in precision measurement applications.

Energy loss and various manufacturing defects are also of general concern to imaging systems. Reflection losses may be reduced to about 1% for high N.A. fibers with relatively broadband, polarization insensitive coatings. Fiber optic image guides (as opposed to light guides) typically have a packing fraction which is close to the limit imposed by fiber geometry.

A number of techniques and principles are documented for the delivery of laser beams to remote objects via fiber coupling which are also useful for imaging systems. General information on fiber beam delivery and monitoring systems and associated performance can be found in U.S. Pat. Nos. 4,764,544, 4,838,631, and 5,245,682. 3D imaging systems incorporating fiber optic scanners or receivers are disclosed in U.S. Pat. Nos. 4,645,917, 4,900,146, 5,032,023, and 5,200,938.

In the '917 patent, an imaging system is disclosed wherein coherent image guides are used in both the transmitter and receiver. The '146 and '023 patents illustrate fiber coupling only in the receiver section. Other publications demonstrate the application of scanning through an image guide for confocal imaging, or embodiments utilizing a single fiber which, in conjunction with a focusing element, is mechanically scanned at the output end at a short standoff from the object.

Pigtailed lasers (i.e., a laser array) are directly coupled to either single or multimode fibers resulting in a smooth output beam profile and reduced diffraction effects. A coherent array can be constructed from either single or multimode fibers. However, cost, angle and polarization sensitivity, low efficiency, alignment sensitivity, bend radius, sensitivity, and the resulting adverse effects which must be considered for single mode fibers are disadvantages.

Fiber coupled laser arrays approaching 64 elements are available with a range of effective source sizes, output power, and duty cycle. However, a laser array product with sufficient power and a large space-bandwidth may not be practical at all for high resolution imaging applications. In applications where a fiber is scanned, degradation of the diffraction limited input beam by the fiber optic array can potentially limit image quality.

For image formation with a scanned beam, the size of the focused spot (at $1/e^2$ points) relative to the fiber core dimensions is a fundamental consideration. Three general conditions are to be considered for delivery of the focused laser spot to the array:

Overfilling: Laser spot size larger than fiber size. The potential advantage is simplified alignment of the scanning laser beam to the fiber array. However, thorough examination leads to immediate suspicion regarding degraded image quality caused by strong beam truncation at the edge of each fiber element (cladding), and corresponding loss of contrast associated with diffraction effects and flare light and substantial beam energy going through secondary fibers;

Matching: Specifying an optimum criteria for fiber optic imaging applications so as to maximize a figure of merit for image quality. Several matching criteria are valid, typical selection being a laser spot size ($1/e^2$) of about 0.75 times the core diameter; and Underfilling: A condition where the laser spot size is significantly smaller than the fiber size. Significant underfilling usually requires low f/# optics which are more expensive and limit the depth of focus, and coupling efficiency and lead to an excessive space-bandwidth requirement for the scanner.

Fundamental Limit of Resolution For Fiber-Based Scanning Systems

It is recognized by researchers in the art of fiber optic imaging using scanning arrangements that significant work is needed to quantify the available resolution when a coherent image guide is used in a scanning system. The integrity with which the characteristics of the focused laser spot at the image guide input are reproduced after re-imaging the output face is of critical importance.

The discrete nature of the fiber optic array and the effect of defects on image quality are important to consider in any imaging application, but are very important for the scanning beam configuration.

SUMMARY OF THE INVENTION

An object of the present invention is to provide a method for obtaining knowledge regarding the multiplicative noise effects of fiber optic intensity modulation to determine optimum design characteristics of a filter for use in a scanned remote imaging method and system.

Another object of the present invention is to provide a method and system which use knowledge obtained regarding the multiplicative noise effects of the fiber optic intensity modulation to restore an image of the object which has been corrupted by the modulation, hence providing remote imaging capability to within the obtainable resolution limit set by the coherent array and auxiliary optical system.

An object of the present invention is to provide a method and system which enhance the quality of imagery obtained in a fiber optic scanned imaging system to obtain information recovery to the available resolution limit set by the fiber optic array and associated optical system.

Another object of the present invention is to provide a method and system including an internal reference subsystem to obtain the position of the fiber optic array relative to external measurement devices so that measurement accuracy can be maintained over time, temperature, and an assortment of other environmental varying conditions.

Still another object of the present invention is to provide a method and system which reduce the requirements of tight control over the scanning beam position by providing time and beam position information indicating "data valid" and "X,Y" for subsequent image correction in a digital computer or signal processor.

Yet still another object of the present invention is to provide a method and system including a self-calibrating feature requiring no external target, thereby eliminating significant errors associated with the roughness and reflection characteristics of the target surface, which, in turn, produce unwanted fluctuations in the location of sampling points.

A further object of the present invention is to provide a method and system including a miniature imaging probe used for obtaining depth, gray scale, motion, or color information in otherwise inaccessible areas including hostile environments, the human body, and industrial applications.

A still further object of the present invention is to provide a method and system including a flexible imaging probe used for obtaining depth and color information in applications requiring multi-axis motion, articulation, or in-situ operation such as micromachining or medical imaging where high speed miniature imaging probes are useful.

In carrying out the above objects and other objects of the present invention, a method is provided for determining design characteristics of a filter for reducing multiplicative noise caused during image transfer through an array of discrete transmissive elements. The method includes the steps of generating a multiplicative noise spectrum associated with the array of discrete transmissive elements and determining an object function corrupted by the multiplicative noise from the noise spectrum to determine the design characteristics.

In carrying out the above objects and other objects of the present invention, a scanned remote imaging method is provided. The method includes the step of (a) supporting a group of image transfer elements having an input end and an output end. The input end is positioned substantially at a focal point of a focusing lens. The method also includes the steps of (b) generating a beam of electromagnetic energy; and (c) scanning the beam through the focusing lens at the input end so that the beam (1) is delivered to the output end, (2) irradiates an object positioned beyond the output end, and (3) generates a resultant electromagnetic signal after irradiating the object. The method further includes the steps of (d) measuring an amount of electromagnetic energy in the resultant electromagnetic signal to obtain a first electrical signal; (e) measuring a portion of the electromagnetic energy in the beam between the input end and the object to obtain a second electrical signal; and (f) generating an image of the object based on the first electrical signal. Finally, the method includes the steps of producing a control signal based on the second electrical signal, and wherein one of steps (a) through (f) is controlled based on the control signal to reduce imaging errors and improve image quality.

Preferably, step (f) is controlled based on the control signal.

A system is also provided for carrying out each of the above method steps.

Still further in carrying out the above objects and other objects of the present invention, a system is provided for remote imaging. The system includes a source of electromagnetic radiation, means for scanning a beam of the electromagnetic radiation to obtain a scanning beam of electromagnetic radiation and means for supporting discrete transmissive elements which transfer the scanning beam of electromagnetic radiation along a scan to irradiate an object. The discrete elements produce unwanted amplitude modulation along the length of the scan. The system also includes means for generating a resultant electromagnetic signal after irradiation of the object. The signal is a function of the electromagnetic radiation irradiating the object and an object function. The system further includes means for measuring the amplitude modulation to obtain a compensating signal and processing means for processing the resultant electromagnetic signal and the compensating signal to compensate for the unwanted amplitude modulation. In this way, the object function is estimated by the processing m eans which reduces or eliminates the amplitude modulation for the purpose of restoring image quality to within the available limit of resolution of the system.

In general, the invention disclosed herein is utilized to correct an image for sampling limitations associated with the fiber array and the numerous other imaging errors, which are manifested by a decrease in resolution and image clarity.

The method and system of the present invention allow the available limit of resolution to be achieved in a fiber-based scanning system, wherein scanned image samples are synchronized with spot positions corresponding to the center of each fiber to avoid generating spurious data points. This condition is maintained dynamically, over widely varying environmental conditions. As previously described, image quality is severely degraded when the spot substantially overlaps the boundary of the fibers. Over time and temperature, slow term drift in the beam position from either the laser scanner or fiber assembly can lead to sampling errors and image instability, particularly in harsh and rugged environments.

The invention disclosed herein provides a method for effectively achieving the practical limit of image resolution with a fiber optic array in an imaging system where a plurality of discrete transmissive elements for image transfer such as optic fibers (typically an image guide or self focusing array) is used to transmit a scanning beam of radiant energy to an object. A beam reference sub-system of the system of the invention includes an auxiliary beam collection means disposed between the fiber input face and the object in which a small fraction of the electromagnetic energy emitted from the fiber array is delivered to a detector which produces electrical signals representing variation in electromagnetic energy and possibly the position of the emerging light spot. In the general case, the electrical signals may be converted to digital data for subsequent use in a signal processing device such as a computer which may store a fiber intensity (and position) map, or a pipelined digital signal processor for real time correction. In any case, the information is utilized to provide optimum sampling information, to identify valid data, to locate spurious data points, and to track any short or long term drift in the beam or fiber position. Resampling or data smoothing can be done prior to mapping the data points to the output image. These operations permit recovery down to the resolution limit determined by the fiber spacing, size, and optical system. Variations in potential embodiments range from simple offsets of timing information controlling image sampling through complete storage of what is effectively a correction map representing the fiber intensity and position profile.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

In general, the "matched" spot-to-fiber size condition is the preferred criteria for the fiber-based imaging method and system of the present invention. A combination of input beam f/# and fiber diameter is selected such that input spot diameter is as large as possible without the fiber inducing truncation effects. In this case, the focused spot diameter defined by the $1/e^2$ intensity points is specified to correspond roughly to one-half of the individual fiber core diameter. Neglecting spot broadening caused by scatter, the apodized Gaussian beam criterion approximates enclosed energy to about 99.9% within the full fiber diameter. This is somewhat more conservative than the 0.75×fiber diameter recommended by some sources, but allows for the presence of inherent diffraction effects within the laser beam which may render the spot distribution to significantly depart from a Gaussian and introduce substantial optical crosstalk. This choice allows margin for signal processing operations, at the expense of a somewhat larger space-bandwidth product requirement for the laser scanner.

Figure 1:
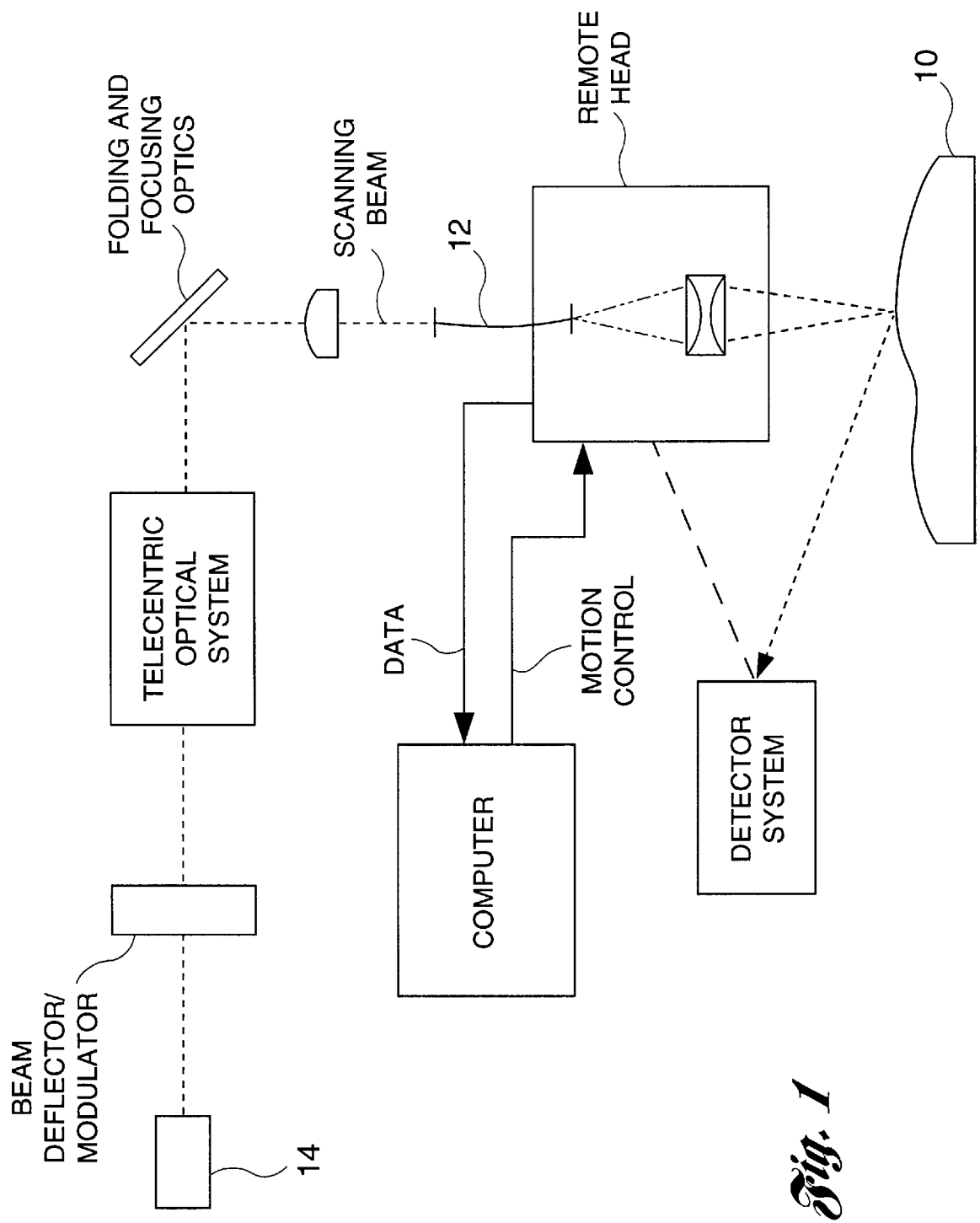
FIG. 1 is a schematic view of the elements of a fiber optic remote imaging system utilizing a scanning beam (receiver not shown) and conventional optical elements.

Referring now to the drawing Figures, there is illustrated in FIG. 1 the basic elements of a fiber optic imaging system incorporating a beam scanner. A sequence of fibers is illuminated by a flying spot scanner and re-imaged onto an object 10 at a remote location. The fibers are typically part of a coherent bundle 12, but may "fan out" to illuminate different regions. Typically, the illumination source will be a laser assembly 14 having either a semiconductor laser diode, gas laser, or solid state laser. In some cases, multiple wavelengths may be desirable which can illuminate the fibers simultaneously if desired.

The laser scanner may be a translation stage, polygon, resonant or linear galvanometer, piezoelectric, diffractive, or refractive scanner and may incorporate any number of additional hardware components for very high speed dynamic range control or other specialized functions.

Figure 2:
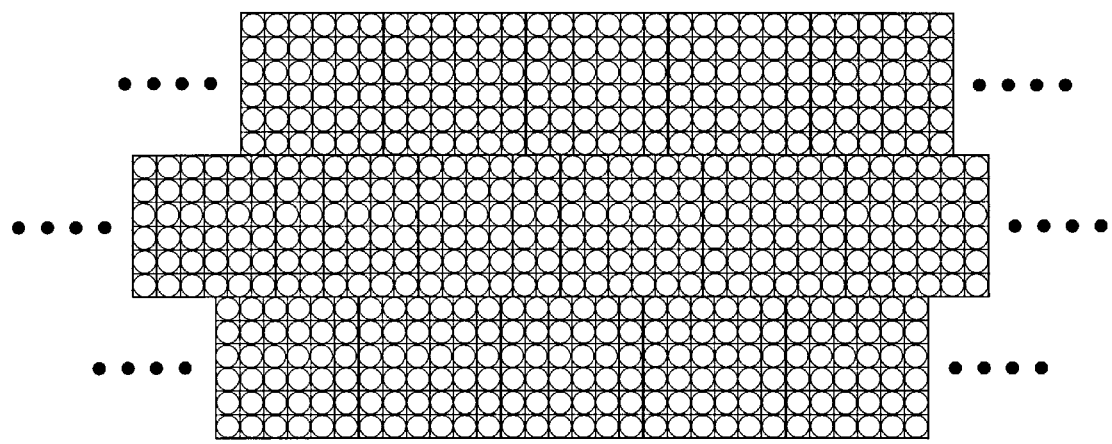
FIG. 2 is a schematic end view of a typical coherent image guide which illustrates how small arrays, typically 5×5 up to 10×10, are concatenated to form high resolution image guides which may be several thousand elements in each dimension (in this case, the fiber core is about 60 $\mu$m with a cladding thickness of about 5 $\mu$m)

A very useful approach is to use a 2 dimensional image guide (i.e. FIG. 2) and to provide a scanning beam in both the X and Y directions. This can be done using any preferred combination of well known beam scanning technologies cited above. To obtain the highest possible spatial resolution in a compact system, the fiber diameter will typically be 5–10 μm with cladding thickness of about 3–5 μm.

The output end of the array is re-imaged onto the scene to create an object scanning beam.

The detection system may be included in the transmission path, receiving through the light guide as practiced in coaxial or confocal imaging as shown by the prior art.

The receiver of such a system could also be fiber optic coupled and mounted off-axis to obtain depth information via the triangulation principle as shown in the above-noted prior art patents. In either case, light reflected from the object is captured and transmitted (possibly through the image guide) to a detector system. Depending upon packaging constraints and laser energy requirements, the receiver may be included in the fiber optic head or a miniature optical system and detector system integrated with the unit. Self-focusing arrays provide a convenient choice over a somewhat restricted range of array sizes, lengths, and spot quality requirements.

One key aspect of the invention relates to a method and sub-system for sampling the fiber optic output as illustrated in FIGS. 3, 4, 6 and 8 and providing beam intensity and possibly position information to a processing device such as a computer which controls sampling in time (and space) of the incoming image information within the detector system. The operation is dynamic, self-calibrating, and free of a requirement for an external target which, aside from convenience and application dependent restrictions, introduces significant imaging error. As discussed earlier, spurious data points will be present if the image sampling is not properly related to the position of the scanned spot relative to the fibers.

There are two components which can affect the beam position variations (i.e. instants for optimum sampling):

Short Term Fluctuations. A typical laser scanning system will have reproducibility at any point about +−0.25 spots on the average for repetitive scans, although the mean fluctuation may be small. In many cases (i.e. "matched"), the variations will introduce measurable asymmetry in the point spread function which can degrade measurement results; and Long Term Fluctuations. Slow term drift must also be accounted for, but the duration between successive calibrations is much longer than above.

If the fiber array is considered to be a "grating object", then monitoring of the modulation waveform and peak intensity detection can be used to synchronously sample the laser output by using a "fiber image" or "map" (terminology to avoid confusion with the object image) of the fiber intensity pattern as a reference. With host computer control, the sub-system for self-calibration and optimum sampling can be activated as little or often as desired with no requirement for an external calibration reference.

Figure 5:
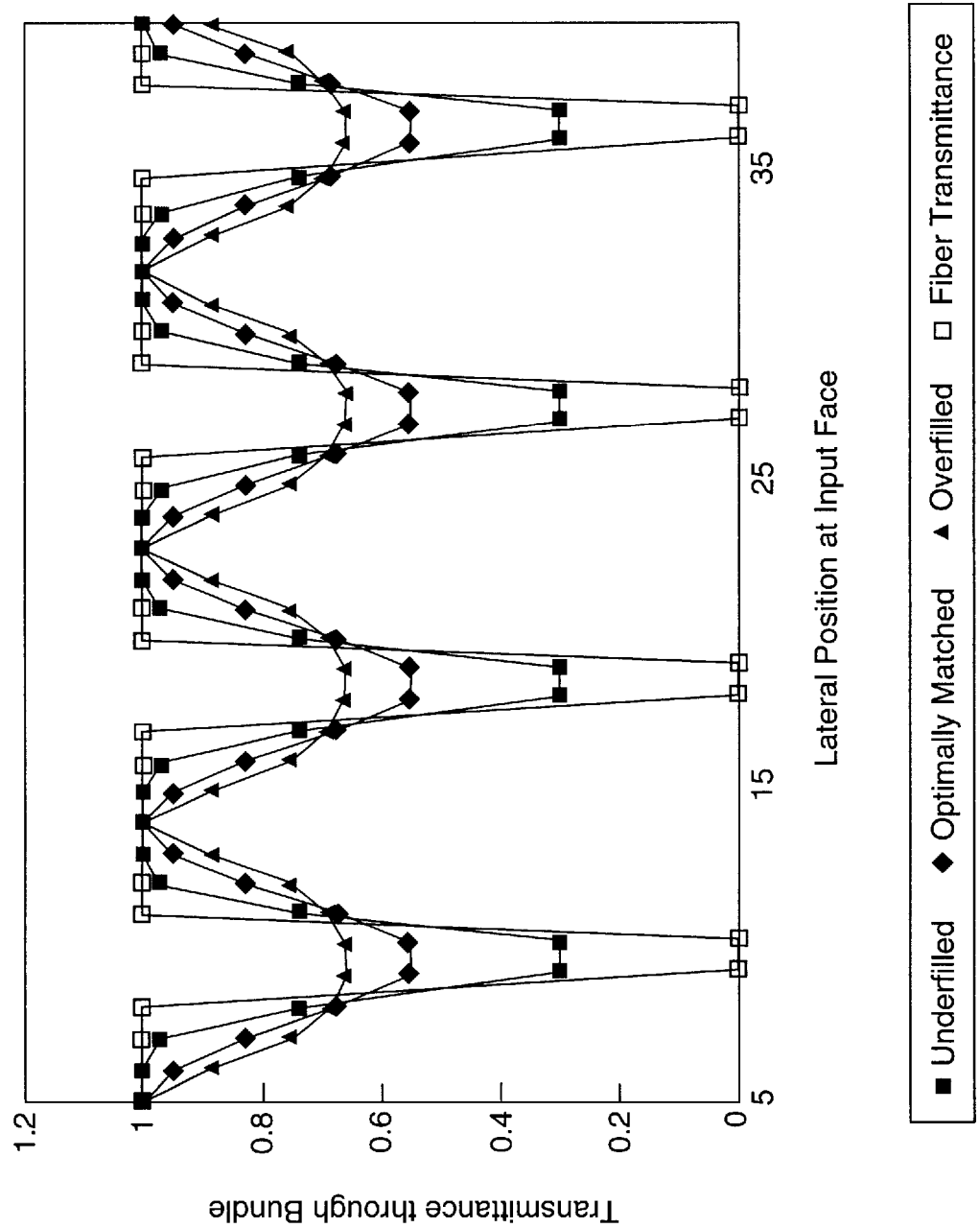
FIG. 5 is a graph which illustrates simulated waveform appearance when a beam is scanned across a plurality of fibers (profile)

FIG. 5 illustrates another embodiment of the invention. In this case, only the time based intensity profile at the fiber output is monitored. In this arrangement, a group of fibers 50 (i.e., an incoherent array) not used for imaging is positioned so as to receive a small fraction of the energy emerging from the fiber as delivered by a relay and field lens assembly 52 configured so as to provide a time invariant image of the input pupil to the incoherent array. The field lens concept is described in standard optical texts.

This reference fiber array 50 (if used) or, alternatively, a photodiode and amplifier 30 mounted in the remote head 32 (i.e. FIG. 3) is preferably optically isolated from the object being imaged so that back reflection (and associated variation) does not corrupt the readings. On the other hand, because the output beam is not "isotropic" (like obtained from a filament), a means of redirecting a fraction of light (i.e. a coated pellicle or partial mirror 34) is needed to provide a reference beam. As the optical power level compared to the detector (usually a photodiode coupled to the fiber) is high, light delivery may not require tight focusing with a lens, but a simple lens (possibly a miniature Fresnel lens) is shown here as a field lens 36. The reference beam is converted by a transimpedance amplifier 37 to an electrical signal which, for the most general embodiment envisioned, is subsequently digitized by the signal processor or processing unit 38 and processed as will be described later.

The optical systems for beam sampling as illustrated in the drawing figures shows conventional optics for beam manipulation. Depending upon fiber bundle size and space requirements, the function can be suitably implemented with any number of modern techniques for micro-optics fabrication, including micro-machined miniature optical assemblies and diffractive optics. The "macroscopic" illustrations herein are intended to clarify the functional specification.

In an alternative which is somewhat more complex or at least requires additional hardware, a lens is required and laser energy is delivered to a position sensitive detector which replaces the photodiode 30, the detector having at least one position sensitive axis. Separate additional signal processing operations, most often ratiometric computations, are required to derive the position information. The information provided by the processor 38 will be intensity and beam position information which is sampled at a rate much faster than the pixel rate of the output image of the object, but is feasible to obtain as the required dynamic range for processing the reference signal is relatively low and peak detection is of primary interest. The advantage of this approach is to obtain very precise beam position information so that subsequent interpolation algorithms can provide sub-pixel accuracy. The use of position sensitive detectors and the associated ratiometric processing required to obtain position information is well documented and exemplified in a number of U.S. patents.

Figures 6A, 6B, 6C:
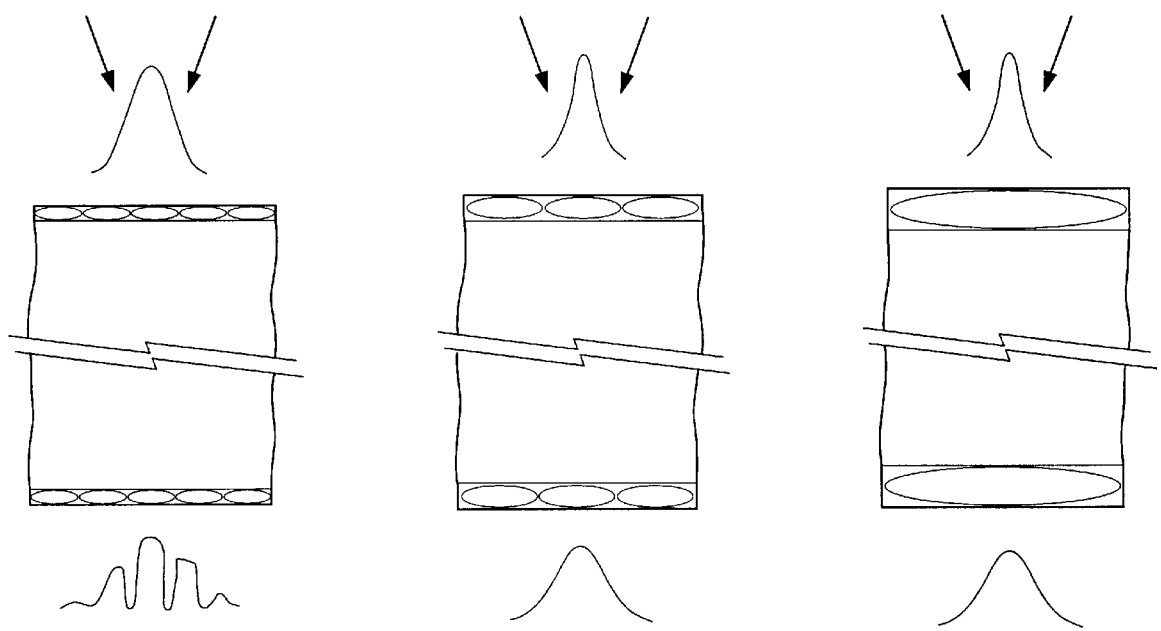
FIG. 6 is a schematic view of an alternate embodiment of the system of the present invention including an incoherent fiber optic bundle and conventional optics in a beam sampling system.

The simulated intensity waveform in FIG. 6 illustrate a series of peaks and valleys having contrast related to the laser spot diameter and fiber element size and cladding dimensions, graphically representing the energy enclosed in each fiber. The spatially varying transmission function of the fiber array amplitude modulates the incident light and imposes a "carrier" frequency onto the object which reflects or transmits energy to the detector/amplifier system #1 for image formation. Large maximum enclosed energy correspond to high peak-to-valley contrast and modulation index. In practice, the modulation frequency is not as "pure" as what is obtained from say a crystal oscillator. Furthermore, if regions corresponding to the boundary of the fibers are sampled, the spatial extent of the spot distribution on the surface ("flare") leads to optical crosstalk. Peak detection on the intensity waveform determines instants at which the data is valid and the beam is to be sampled by the receiver system. The utility of the present invention, both for 1D and 2D arrays, will be appreciated if one considers misregistration of the scan line to the fibers by a fraction of a spot diameter. A decrease in modulation depth will immediately result in a corresponding loss in image contrast.

Figure 3:
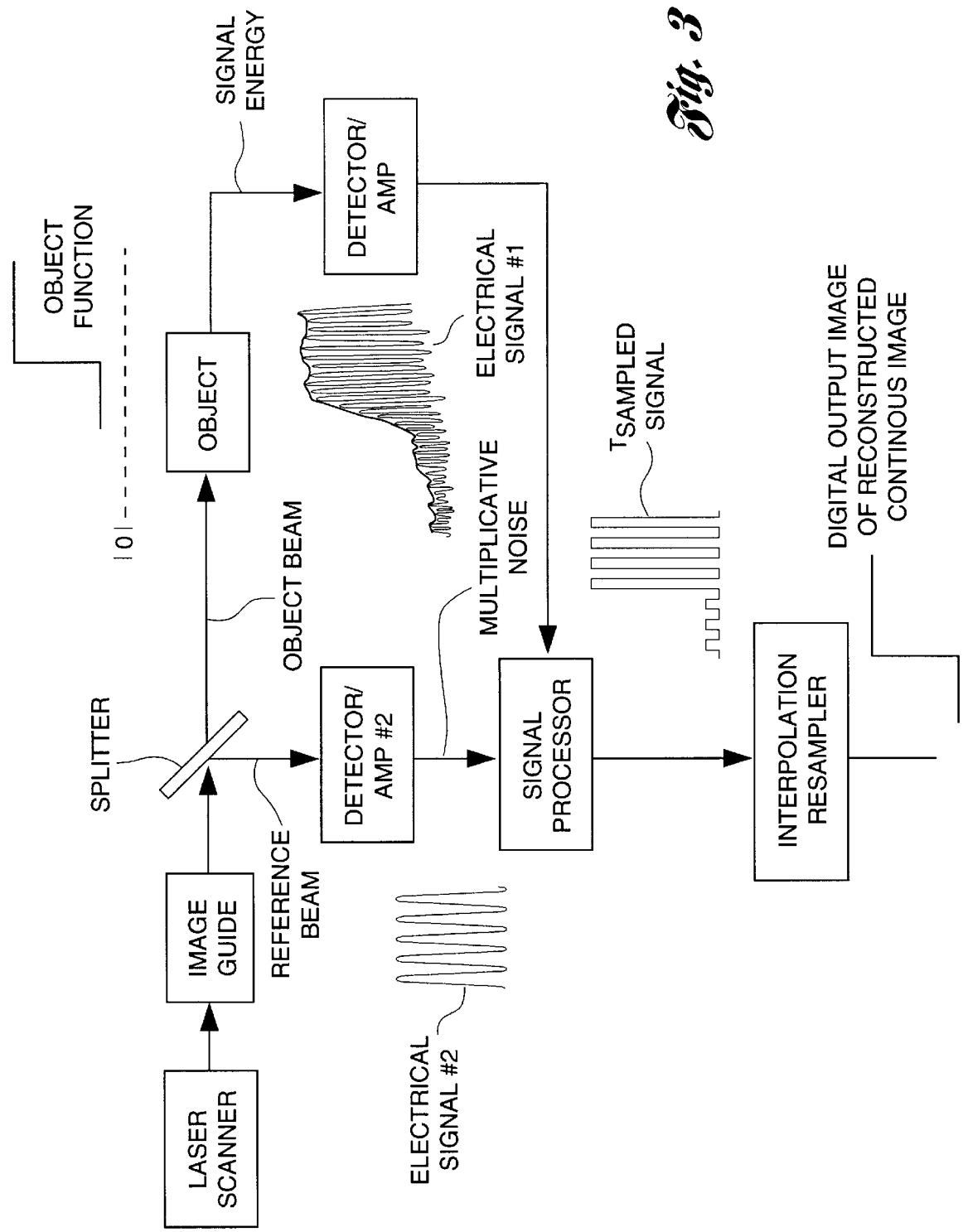
FIG. 3 is a schematic view showing the effect of amplitude modulation induced by the fiber optic array, and sampling error on image formation; the beam sampling system and signal processor is used for image reconstruction and enhancement.
Figure 4:
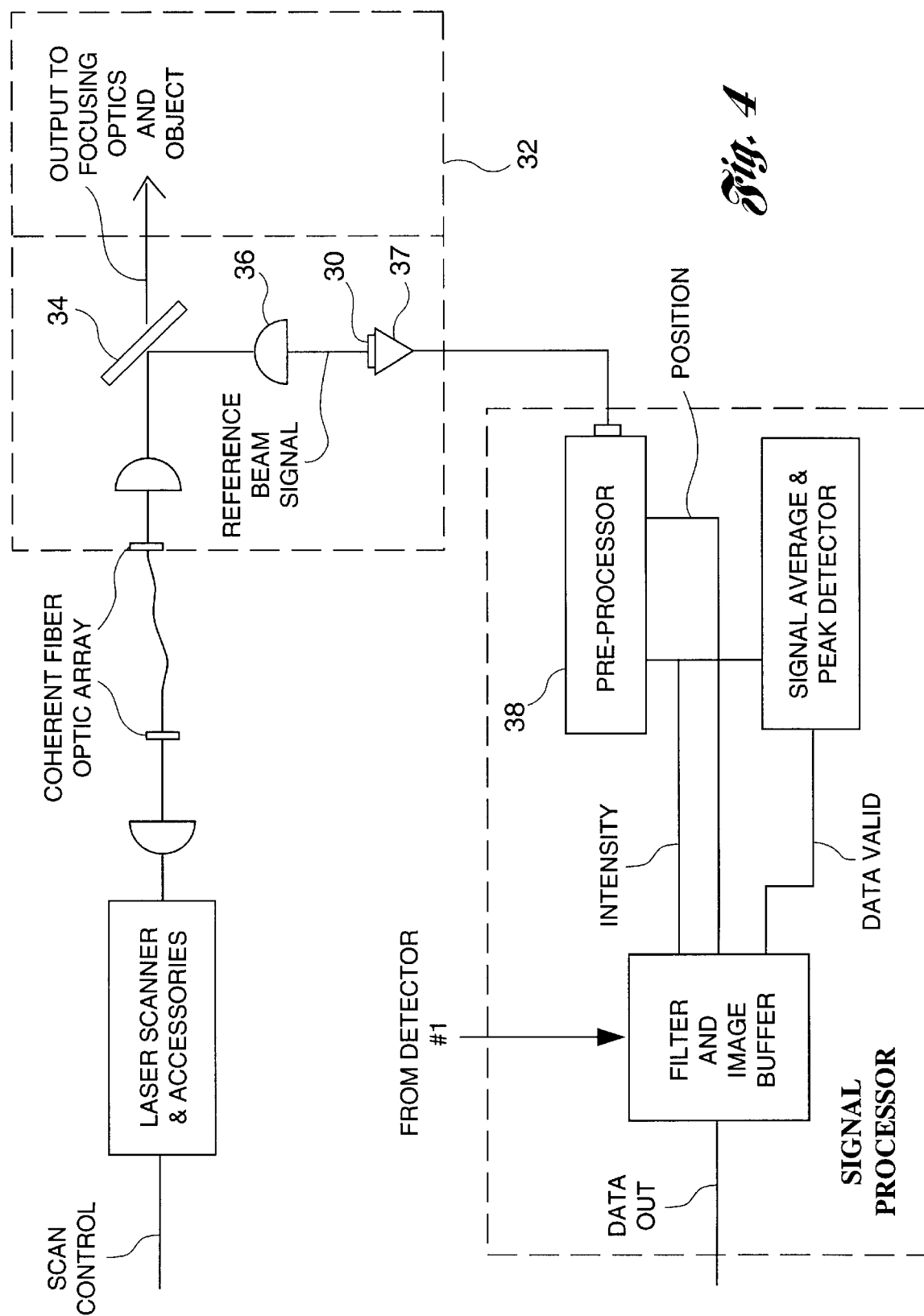
FIG. 4 is a schematic view of a coherent array beam sampling and processing system of the present invention.
Figure 7:
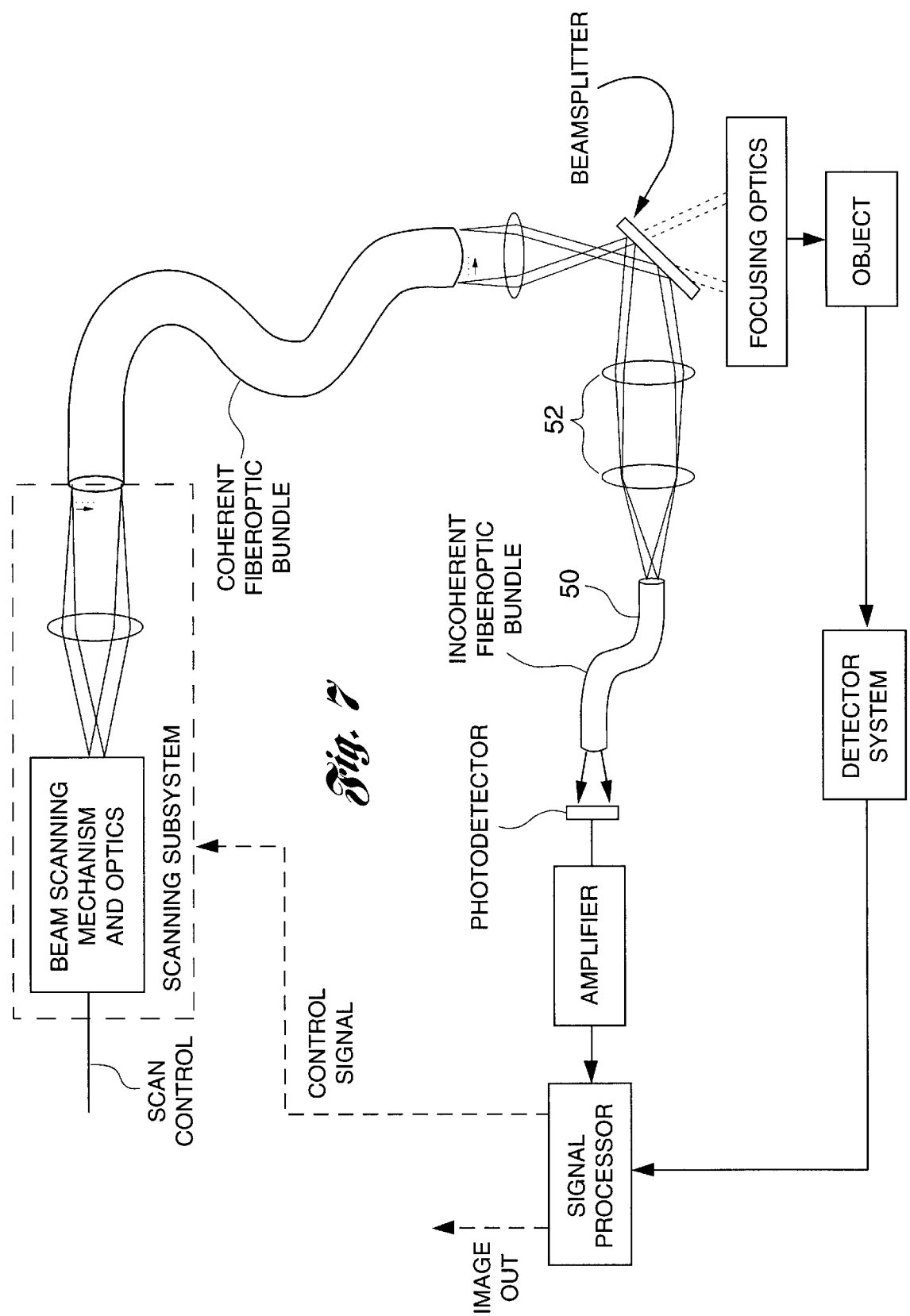
FIG. 7 is a schematic view illustrating how incident focused laser beams are converted to different spatial distributions at the output face of a fiber in three different situations.

The peak detection systems of FIGS. 3 and 7 can be designed to operate at a pixel rate substantially faster than the image sampling rate for economy. Image data will be valid about every 4th sample (minimum) so a rule of thumb is to allow the sampling sub-system to operate at least 8 times faster for developing the map. Availability of ultra-high speed monolithic "building blocks" like flash A-D converters with word lengths of 6 bits and greater, track and hold devices like the AD9100 produced by Analog Devices, Inc., (20 ns response) and the Analog Devices, Inc. AD-9696 comparator (15 ns response) presently allow for peak detection at rates significantly faster than video rates. Hence, the sampling system can operate fast enough to support locating the spot center to sub-pixel accuracy, yet provide rapid throughput.

The elements of an implementation of perhaps the most basic sub-system applicable, for a single dimension coherent image guide (i.e., a 1D array) includes a detector/preamplifier whose output signal is processed by the sub-system and generates a "sample data-valid" pulse which may also be used with either measured or assumed time base data (as would be generated by a high frequency clock oscillator) to provide for sub-pixel mapping to an output grid (an option for precision measurement systems). A noise filter of the sub-system is advantageous to remove high frequency noise which can effect a pulse generation circuit and result in false triggering. The sub-system includes a peak detector (which introduces a finite delay and slight error between the "data valid" signal and image data) or, alternately, a positive-going slope detector which is used to generate the sample pulse based upon slope measurements which fall within a range of values indicating effective maximum energy enclosure within the fiber (i.e., a predictor of the peak to compensate for the inherent delay). A thresholding device is advantageous in the application of the invention because the limited dynamic range of peak signals allows for a comfortable threshold value of say 75% of the average intensity. The slope or peak detection circuitry is gated off when the input signal is below threshold.

The basic operation of the pulse generation section is familiar to those skilled in the art of pulse circuits and signal processing. For example, in a sampled data system, a signal corresponding to time t1 is sampled and held and compared in magnitude to the signal corresponding to the next time sample t2. If the slope changes sign (peak detection) a pulse is generated. Alternatively, if the difference falls within a predetermined voltage range (prediction), the "data valid" signal is produced at a predetermined instant of time (i.e. one clock cycle) later. The circuit may also incorporate a modification which checks to see that the data falling within a specified range occurs over several samples in sequence to avoid possibility of a noise spike triggering false data. The circuitry is relatively simple for this embodiment, but there is slight misregistration between the best sampling instant and the "data valid" command. However, this offset may be compensated by other delays in the video hardware associated with the object imaging system.

Figure 8:
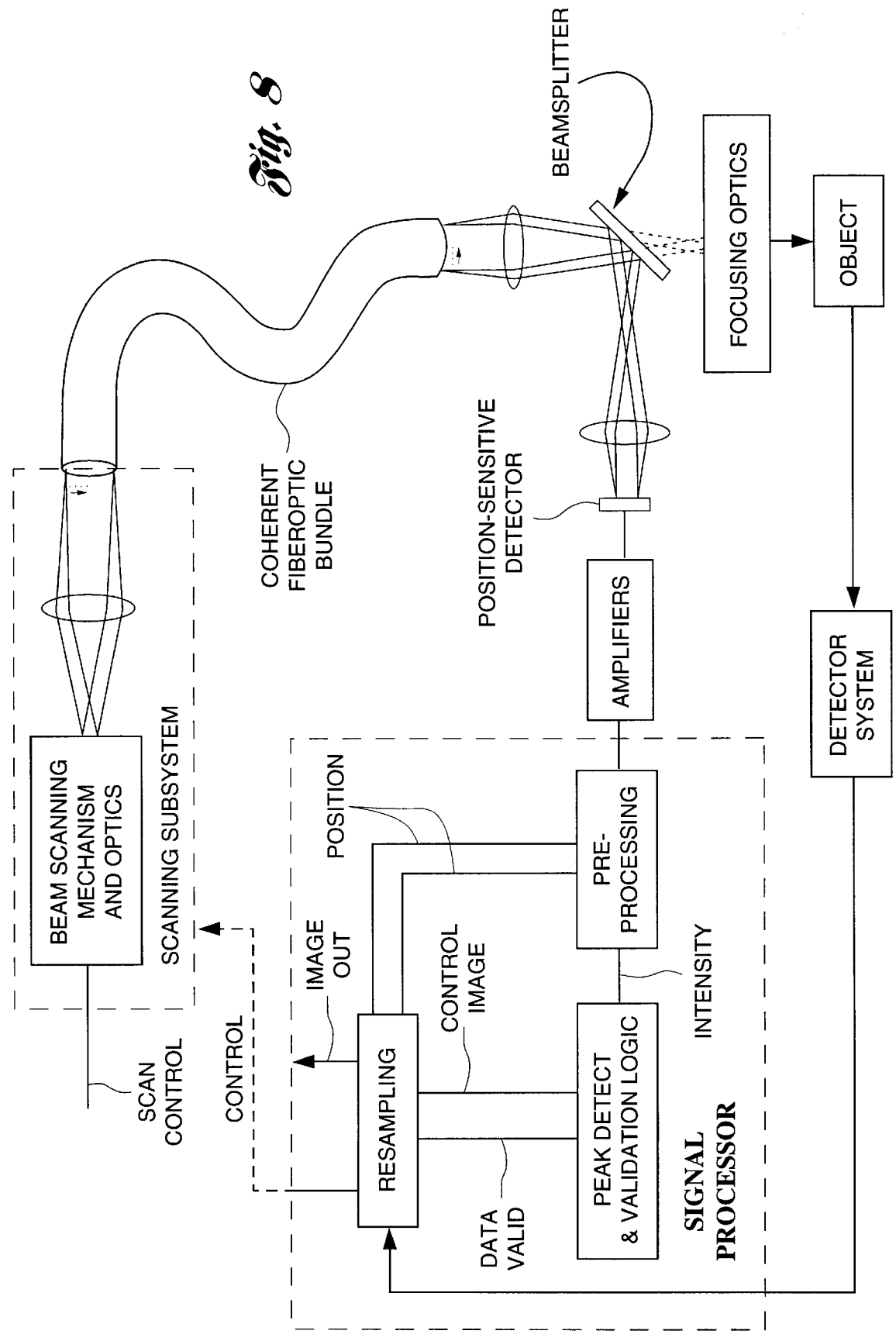
FIG. 8 is a schematic view of yet another embodiment of the system of the present invention including a position-sensitive detector.

Monolithic devices are now readily available which can perform at least a substantial part, if not all, of the peak detection and noise filtering operations. For example, the operation is similar to data synchronizers used for disk read/write operations as illustrated in "Mixed Signal Design Seminar", published by Analog Devices (1991). Slope (peak) detection operations are performed on a filtered signal supplemented by "data qualifier" logic. An output pulse is generated as shown in FIG. 8. The AD-890 wideband channel processing element and AD-891 channel qualifier perform the functions at a 40 Mb rate and are mass produced as devices to satisfy a huge demand in the disk drive industry. It is possible to find use of such elements in performing the functions described herein.

Figure 9:
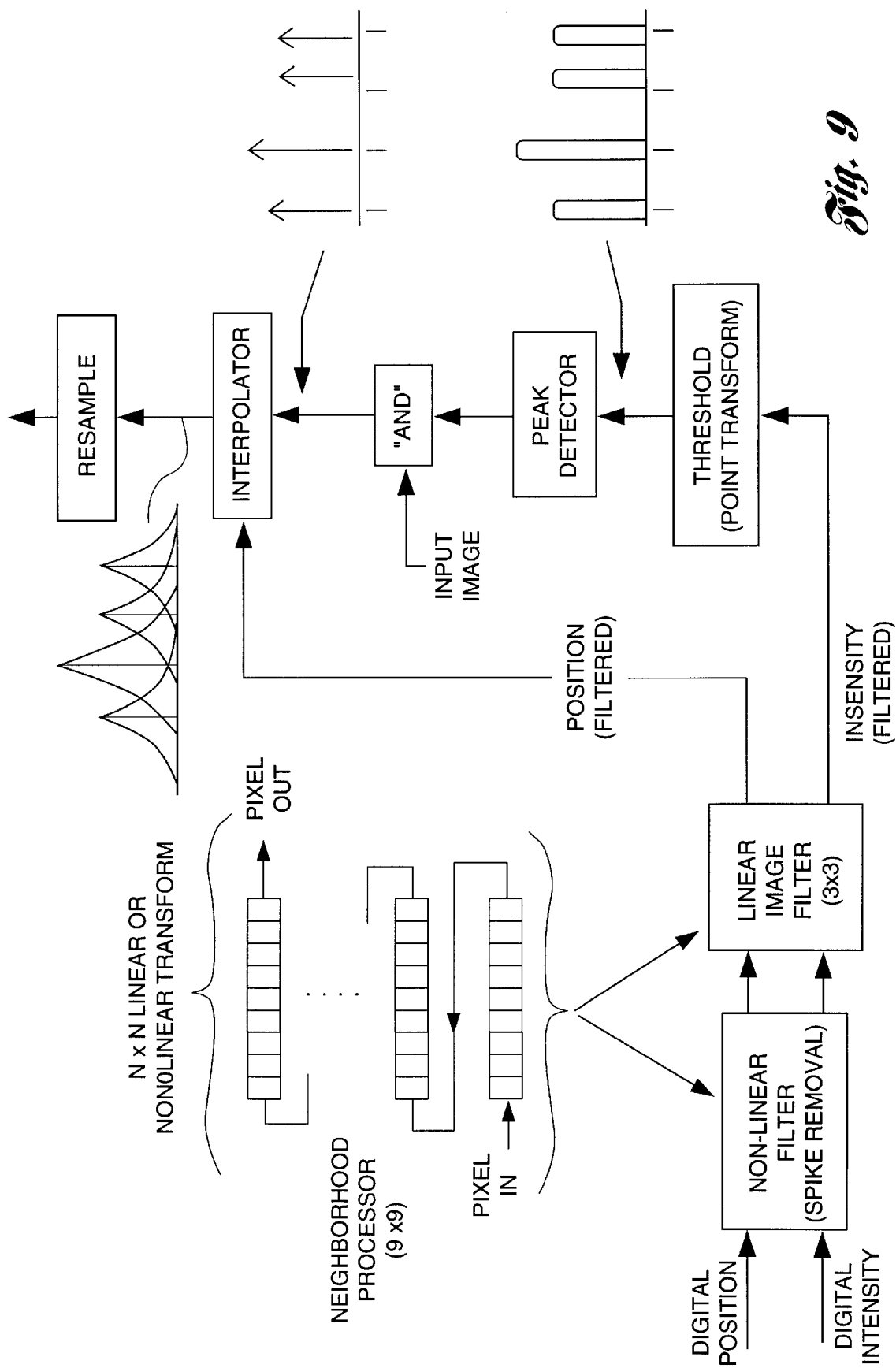
FIG. 9 is a schematic diagram of an alternative embodiment incorporating pipelined 2D signal processing operations and line buffers.

If a 2D array is used, which may be preferred in many cases, with a corresponding X,Y scanner, the processing and associated circuitry is more complex. FIG. 9 shows an embodiment where the signal from the detector is digitized and a high resolution line image buffer will store an adequate number of lines of data. Typically, at least 5 lines of data will be stored. The data may first be filtered with a 2D FIR or IIR digital filter performing a function equivalent to the analog noise filter described above. Likewise, the image data which is subsequently used for measurement will typically be stored, perhaps oversampled by say 8X with respect to the target pixel rate.

Digital signal processing operations may be used to perform the peak detection operations, the simplest being a search for smooth local maximum over a region defined by rows and columns. "Perfect" temporal alignment may be approximated with a curve fitting algorithm, exemplifying the flexibility of a digital system. The penalty is the image memory required, where the previous simpler 1D system only required mostly analog processing for pulse generation but includes a delay. Because the intensity profile has a narrow dynamic range, the word length requirement is not severe. Practical implementation of this approach is well within the scope of today's technology and economy for higher speed operation is expected over time. Additional digital operations may include interpolation for mapping adjacent valid sample points to the output grid.

FIG. 9 also illustrates the details of a general processing approach (not always required) where the data from the position sensitive detector in FIG. 8 (replaces photodiode 30) is utilized to provide spatial correction of the valid data points. Perhaps an additional benefit (not shown) of the flexibility of the digital processor will be to perform additional data qualification by noting any large deviations which might be explained by output beam distortions introduced by environmental factors.

If necessary, high speed interpolation algorithms can be used to correct for slight variations between sampled points (i.e. fiber spacing non-uniformity) prior to forming the image on a uniform re-sampled output grid. Those skilled in the art of digital signal processing recognize that various algorithms varying in efficiency and accuracy can be used for both the peak detection, interpolation and mapping operations. With 2D scanning inputs, these algorithms may be implemented with one of many neighborhood processing chips like the HSP48908 3×3 video convolver with on board line buffers or with a high speed CPU and memory. As the speed of memory is increasing and the cost is substantially decreasing, the approach will become increasingly economically feasible.

For example, the HSP48908 has a 32 MHz clock rate and storage for 3 lines of 1024 pixel, 8 bit data in an approximate 1 in. square package. Furthermore, non-linear neighborhood processing chips (i.e. rank value functions) have been available for some time in approximately the same package form, factor and size. Hence, it is quite possible that the functions shown in FIG. 9 can presently be implemented on a PC board which can be included with present PC compatible image hardware.

The preferred embodiment of the invention is dependent upon application requirements. As with many applications, there is a tradeoff between speed, accuracy, and cost. It should be recognized that, in addition to the illustrated implementations herein, alternative embodiments may be constructed which are a mixture of the simple analog implementation and the digital approach, or a digital approach could be substituted for the 1D analog system without departing from the scope and gist of the invention.

The corresponding "data valid" command and corresponding peak X,Y locations are stored with the (localized) depth or color information transmitted by the receiver. The position information is useful in metrology and calibration systems for generating a series of coordinates corresponding to the beam location, and hence the object location. For any application, a tradeoff may be made between the measurement speed, cost, and accuracy, and resolution. As a minimum, this invention will provide a "data valid" indication based on analysis of the fiber output waveform. "Wandering" of the laser beam or beam assembly, either short or long term, will produce both a change in intensity and erratic position information. Correction, perhaps with a miniature piezoelectric mechanism on the input, can be used to automatically calibrate and fine adjust the system in response to the control signal for improved long term stability. With the invention, and the corresponding address generation for valid data points, the stringent requirement for absolute pointing accuracy (both long and short term) of the laser scanners can be reduced.

It is to be understood that a major advantage of the method which distinguishes the invention from other disclosed imaging and beam monitoring systems is the spatial self calibration feature. If a target were used to periodically update the sample locations, an error will be present caused by the surface irregularities and reflectance variations. That is to say that an image of the calibration target is formed as a product of the surface reflectance and irradiated power on the surface. The effect is noise in the calibration data which is spatially variant. The goal is not to monitor the power and spot distribution on the surface as found in high power delivery systems, but to optimize sampling for high speed imaging. A by-product of the approach is the ability to calibrate as little or often as necessary, using the entire array for a complete calibration or a subset for updates during operation without a requirement for a calibration target.

An interesting alternative embodiment could replace the peak detector with a "valley" detector which, if certain assumptions are satisfied, could produce a "sample-data valid" pulse at a predetermined time after the minimum is detected (in a 1D array).

The method described herein can be practiced in various ways to implement the approach as little or often as desired or with different choices of hardware and algorithms without departing from the scope of the invention.

For example, suppose a fiber array is assumed to have substantially uniform spacing, transmittance, and extremely good reproducibility and stability. One might visualize the problem as an application of synchronous detection where the reference beam provides the "carrier" or "local oscillator" signal introduced by the fiber optic intensity modulation. Synchronous detection is known to those in the art of signal processing, and it is recognized that the signal processing function will now reduce to demodulation of the carrier and low pass filtering for signal recovery. The performance will depend upon a number of factors (underlying assumptions) but the method can simplify signal processing requirements.

This method does not conveniently extend to 2D array processing without the use of pipelined digital hardware to correlate the 2D "carrier" pattern. From a practical standpoint, if the array is not truly periodic then the convolution (correlation) kernel is space variant which increases the hardware complexity. Hence, the choice of signal processing method is closely tied to the specifications of the fiber array (i.e. a function of core size, clad thickness, geometric tolerances, etc.) As with an electrical system, any deviation from periodically or linearity will create signal distortions.

Many other alternative embodiments may be implemented with specific arrangements justified based upon specific application information or favorable environmental conditions. For example, simplification of data reduction and hardware may result if a relatively small number of fibers of the 2D array are scanned to provide periodic calibration updates, and the stored coordinates of all sample points adjusted accordingly, where the sample points were obtained with an initial calibration. Three measured non-collinear points provide the minimum information necessary to relate the coordinates with a translation and rotation of coordinate axes. The needed information could be obtained, for instance, by scanning groups of fibers near the corners of the array. This can be done efficiently if the scanning mechanism is addressable (i.e. AO deflector for X scan, linear galvanometer for Y scan will provide both video rate capability and addressability).

Figure 10:
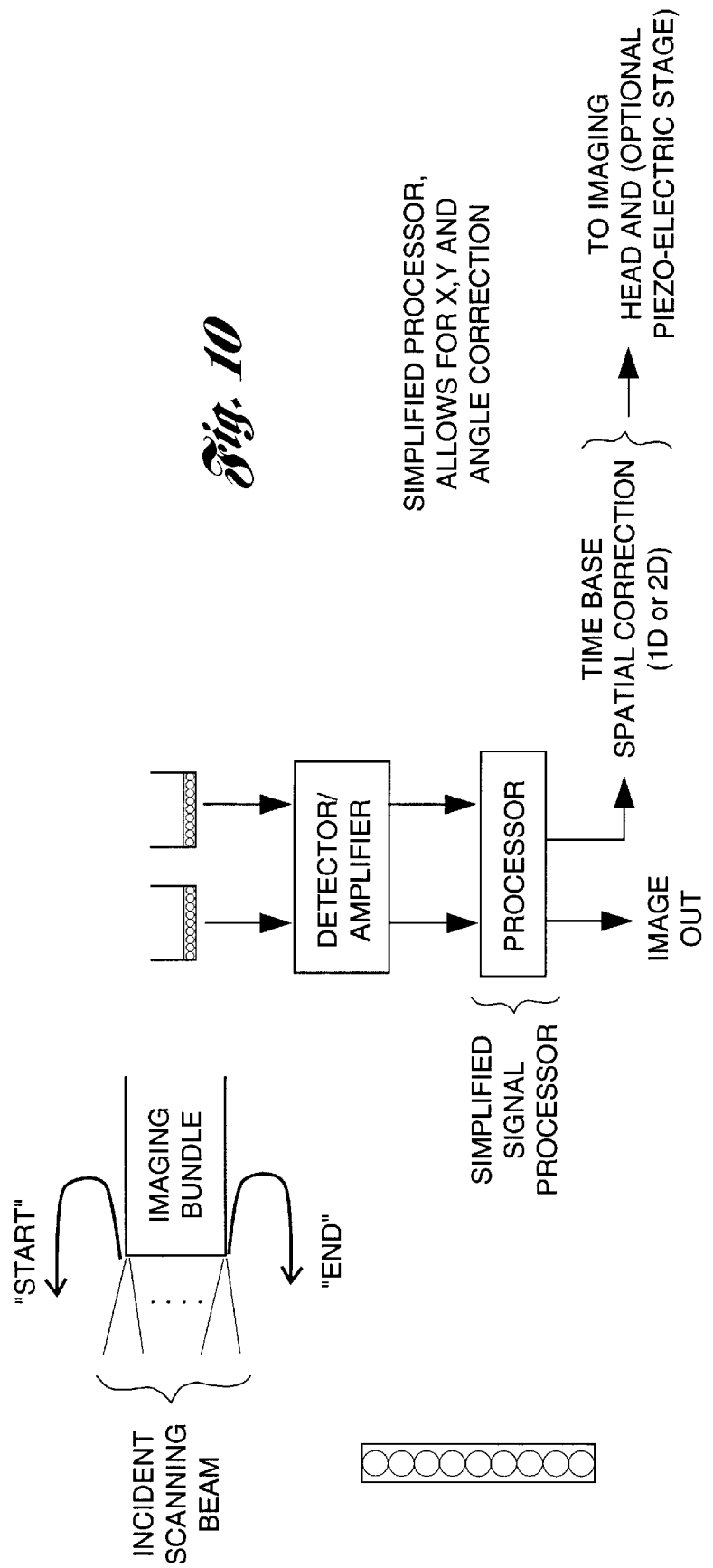
FIG. 10 is a simplified embodiment with a 1D image array augmented by reference fibers producing an output which is used by the signal processor to produce spatial and time base correction.

Alternatively, the array could be constructed with reference fibers (either single or a plurality) at designated points outside the array which may be directly coupled to a detector/amplifier 30 for beam sampling, but not used for image formation. This alternative embodiment is illustrated in FIG. 10, where the peak detector output is analyzed to produce at least one signal, but preferably both start and end of line signals. With such an approach, one must carefully consider the effect of fiber-to-fiber misalignment within the array (particularly in a 1D array system) to adequately specify the configuration.

Figure 12:
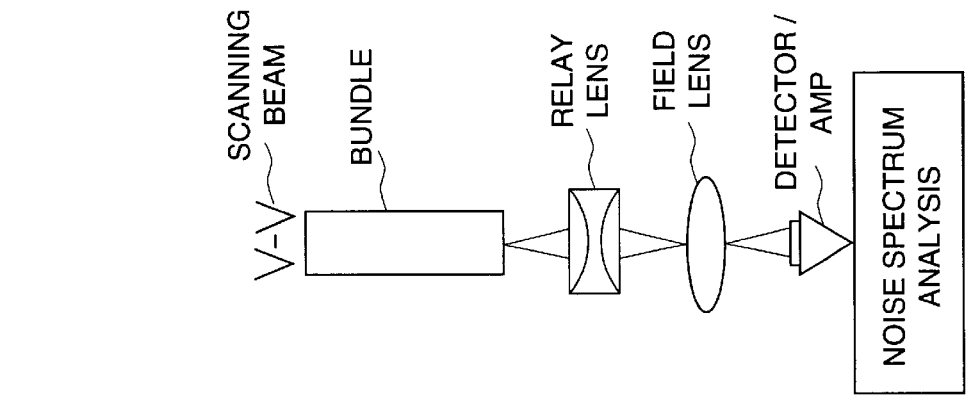
FIG. 12 is a schematic view of a noise measurement system, equivalent to a beam sampling sub-system, from which optimum filter characteristics may be derived.
Figure 11:
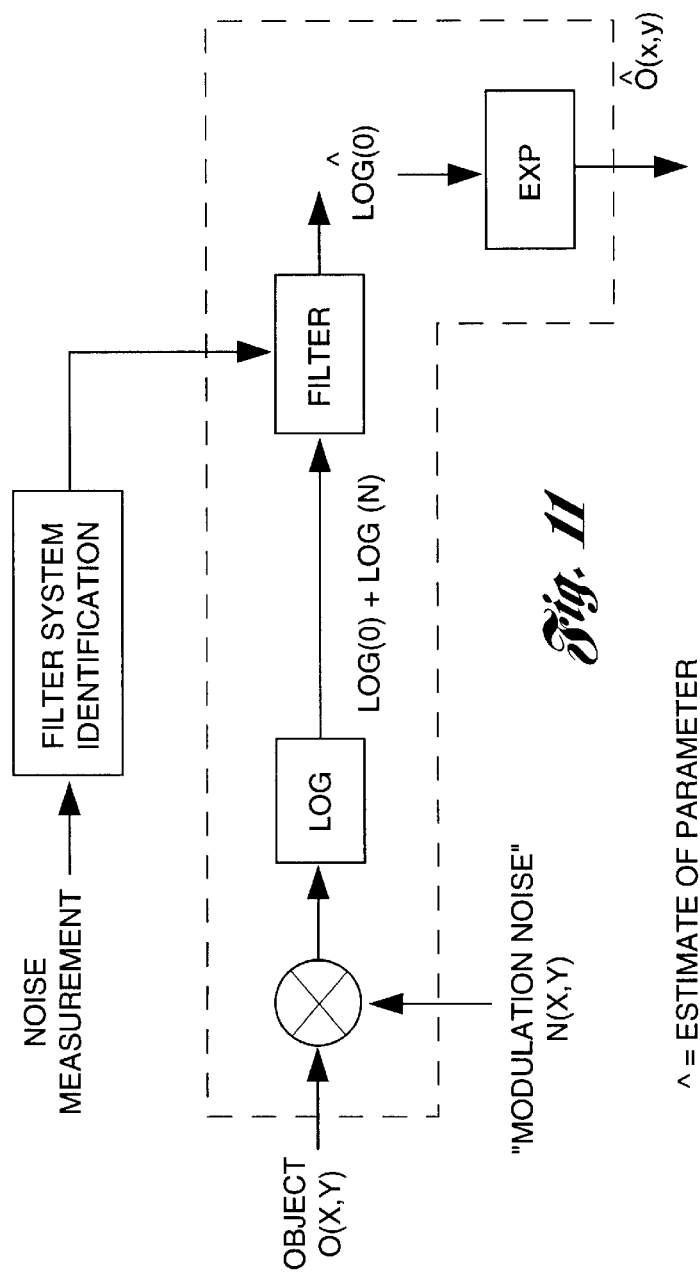
FIG. 11 illustrates signal processing steps for estimating an object intensity function corrupted by multiplicative noise; the noise corresponds to fiber modulation which is to be characterized so as to identify an optimum fiber.

Finally, another contemplated approach to a solution is to attempt to reduce the large amplitude multiplicative noise in the image by an appropriate image filtering operation. FIG. 11 illustrates a homomorphic signal processing approach as taught in signal processing texts, where it is often assumed the noise is random rather than synchronous. For example, the noise source could be local variations in the transmission of photographic film and inherently random. Sufficient knowledge of the spectrum is needed to obtain a good estimate of the object function. In electrical systems, the noise spectrum and amplitude is often measured. From the information one attempts to design an optimum filter. The method of measuring the multiplicative noise spectrum associated with the fiber (FIG. 12) is equivalent to the beam sampling method of this invention. The filter performance and resultant signal to noise will be strongly dependent upon this measurement because of the inherently high modulation depth of the fiber grating.

While the best mode for carrying out the invention has been described in detail, those familiar with the art to which this invention relates will recognize various alternative designs and embodiments for practicing the invention as defined by the following claims.

What is claimed is:

1. A scanned remote imaging method comprising the steps of:
    (a) supporting a group of image transfer elements having an input end and an output end, the input end being positioned substantially at a focal point of a focusing lens;
    (b) generating a beam of electromagnetic energy;
    (c) scanning the beam through the focusing lens at the input end so that the beam (1) is delivered to the output end, (2) irradiates an object positioned beyond the output end, and (3) generates a resultant electromagnetic signal after irradiating the object;
    (d) measuring an amount of electromagnetic energy in the resultant electromagnetic signal to obtain a first electrical signal;
    (e) measuring a portion of the electromagnetic energy in the beam between the input end and the object to obtain a second electrical signal;
    (f) generating an image of the object based on the first electrical signal; and
    (g) producing a control signal based on the second electrical signal, wherein one of steps (a) through (f) is controlled based on the control signal to reduce imaging errors and improve image quality.

2. The method as claimed in claim 1 wherein step (f) is controlled based on the control signal.

3. The method as claimed in claim 1 wherein step (c) is controlled based on the control signal.

4. The method as claimed in claim 1 wherein step (a) is controlled based on the control signal.

5. The method as claimed in claim 1 wherein the group of image transfer elements includes a plurality of optical fibers.

6. The method as claimed in claim 5 wherein the optical fibers are a two-dimensional image guide.

7. The method as claimed in claim 5 wherein the optical fibers are a one-dimensional fiber optic array.

8. The method as claimed in claim 5 wherein the second electrical signal represents fluctuations in the amount of electromagnetic energy from the output end of the optical fibers and wherein the step of producing includes the step of processing the second electrical signal.

9. The method as claimed in claim 2 wherein the step of generating includes the step of sampling the first electrical signal to obtain input data and wherein the control signal is utilized to control sampling of the first electrical signal.

10. The method as claimed in claim 2 wherein the step of generating includes the steps of sampling the first electrical signal to obtain input data and converting the input data into corrected output data in response to the control signal, the corrected output data being utilized to form the image of the object.

11. A scanned remote imaging system comprising:
    means for generating a beam of electromagnetic energy;
    a focusing lens having a focal point for focusing the beam of electromagnetic energy;
    a group of image transfer elements having an input end and an output end;
    support means for supporting the image transfer elements with the input end proximate the focal point;
    a scanner for scanning the beam through the focusing lens at the input end so that the beam (1) is delivered to the output end, (2) irradiates an object positioned beyond the output end, and (3) generates a resultant electromagnetic signal after irradiating the object;
    first means for measuring an amount of electromagnetic energy in the resultant electromagnetic signal to obtain a first electrical signal;
    second means for measuring a portion of the electromagnetic energy in the beam between the input end and the object to obtain a second electrical signal;
    a controller for producing a control signal based on the second electrical signal; and
    means for generating an image of the object based on the first electrical signal wherein one of the support means, the means for generating and the scanner is controlled based on the control signal to reduce imaging errors and improve image quality.

12. The system as claimed in claim 11 wherein the means for generating is controlled based on the control signal.

13. The system as claimed in claim 12 wherein the scanner is controlled based on the control signal.

14. The system as claimed in claim 13 wherein the support means is controlled based on the control signal.

15. The system as claimed in claim 14 wherein the group of image transfer elements includes a plurality of optical fibers.

16. The system as claimed in claim 15 wherein the optical fibers are a two-dimensional image guide.

17. The system as claimed in claim 15 wherein the optical fibers are a one-dimensional fiber optic array.

18. The system as claimed in claim 15 wherein the second electrical signal represents fluctuations in the amount of electromagnetic energy from the output end of the optical fibers and wherein the controller processes the second electrical signal.

19. The system as claimed in claim 12 wherein the means for generating includes means for sampling the first electrical signal to obtain input data and wherein the control signal is utilized to control sampling of the first electrical signal.

20. The system as claimed in claim 12 wherein the means for generating includes means for sampling the first electrical signal to obtain input data and means for converting the input data into corrected output data in response to the control signal, the corrected output data being utilized to form the image of the object.

* * * * *